(12) United States Patent
Wimmer et al.

(10) Patent No.: US 9,610,532 B2
(45) Date of Patent: Apr. 4, 2017

(54) METHOD AND SYSTEM FOR HIGH RELIABILITY OXYGEN SUPPLY FROM MULTIPLE UNITS

(71) Applicant: Pacific Consolidated Industries, LLC, Riverside, CA (US)

(72) Inventors: Robert Wimmer, Breinigsville, PA (US); Jason Burns, Irvine, CA (US); William K. Goshay, Porter Ranch, CA (US); Tarik Naheiri, Dana Point, CA (US)

(73) Assignee: Pacific Consolidated Industries, Inc., Riverside, CA (US)

( * ) Notice: Subject to any disclaimer, the term of this patent is extended or adjusted under 35 U.S.C. 154(b) by 0 days.

(21) Appl. No.: 14/971,175

(22) Filed: Dec. 16, 2015

(65) Prior Publication Data

US 2016/0184763 A1 Jun. 30, 2016

Related U.S. Application Data

(60) Provisional application No. 62/098,052, filed on Dec. 30, 2014.

(51) Int. Cl.
*B01D 53/047* (2006.01)
*B01D 53/053* (2006.01)
(Continued)

(52) U.S. Cl.
CPC ............ *B01D 53/002* (2013.01); *B01D 53/02* (2013.01); *B01D 53/0476* (2013.01); *B01D 53/22* (2013.01); *B01D 53/229* (2013.01); *B01D 63/02* (2013.01); *B01D 53/053* (2013.01); *B01D 2256/12* (2013.01); *B01D 2257/102* (2013.01); *B01D 2257/11* (2013.01);
(Continued)

(58) Field of Classification Search
CPC .... B01D 63/02; B01D 53/0002; B01D 53/02; B01D 53/047; B01D 53/053; B01D 53/22; B01D 53/229; B01D 2256/12; B01D 2257/102; B01D 2257/11; B01D 2257/40; B01D 2257/80; B01D 2259/40007; B01D 2259/40009; B01D 2259/401; B01D 2259/402
USPC ...... 95/19, 22, 23, 95, 96, 130; 96/109, 110, 96/113, 121
See application file for complete search history.

(56) References Cited

U.S. PATENT DOCUMENTS 3,922,149 A 11/1975 Ruder
4,643,743 A 2/1987 Grader
(Continued)

FOREIGN PATENT DOCUMENTS

EP 1245267 * 10/2002

*Primary Examiner* — Frank Lawrence
(74) *Attorney, Agent, or Firm* — Heisler & Associates

(57) ABSTRACT

A multi-unit system combines multiple single bed reversing blower vacuum swing adsorption air separation units together. The units feed a common $O_2$ supply such as a system buffer tank. Demand is monitored and a number of individual units are brought online sufficient to meet demand. If demand exceeds supply, a further unit is brought online. If demand drops below supply by an amount greater than output of a single unit, then a longest operating unit is taken offline. The multi-unit system thus meets demand through utilization of multiple separate units in a highly redundant and highly reliable and scalable fashion.

20 Claims, 4 Drawing Sheets

(51) Int. Cl.
*B01D 53/00* (2006.01)
*B01D 53/02* (2006.01)
*B01D 53/22* (2006.01)
*B01D 63/02* (2006.01)

(52) U.S. Cl.
CPC ...... *B01D 2257/40* (2013.01); *B01D 2257/80* (2013.01); *B01D 2259/401* (2013.01); *B01D 2259/402* (2013.01); *B01D 2259/40007* (2013.01); *B01D 2259/40009* (2013.01)

(56) References Cited

U.S. PATENT DOCUMENTS

| | | | | |
|---|---|---|---|---|
| 6,146,447 | A | * 11/2000 | Sircar | B01D 53/053 95/101 |
| 6,277,174 | B1 | 8/2001 | Neu | |
| 8,496,738 | B1 | 7/2013 | Naheiri | |
| 8,702,840 | B1 | * 4/2014 | Friedman | B01D 53/053 95/19 |
| 2004/0211414 | A1 | * 10/2004 | Cantrill | B01D 53/0446 128/202.26 |
| 2011/0315009 | A1 | 12/2011 | Ambriano | |
| 2014/0260966 | A1 | 9/2014 | Dillon | |

* cited by examiner

METHOD AND SYSTEM FOR HIGH RELIABILITY OXYGEN SUPPLY FROM MULTIPLE UNITS

CROSS-REFERENCE TO RELATED APPLICATIONS

This application claims benefit under Title 35, United States Code §119(e) of U.S. Provisional Application No. 62/098,052 filed on Dec. 30, 2014.

FIELD OF THE INVENTION

The following invention relates to methods and systems for arranging multiple smaller air separation units together to provide for a larger supply of oxygen from the system in a high reliability fashion. More particularly, this invention relates to single bed reversing blower vacuum swing adsorption air separation units and systems of such units coupled together to reliably provide oxygen.

BACKGROUND OF THE INVENTION

The production of oxygen using vacuum swing adsorption (VSA) is well-known to air separation technologists. VSA offers a simple non-cryogenic method to produce gaseous oxygen at purities of 80% to 95%. In the last 20 years oxygen VSA plants have become widespread and are offered in various bed configurations. The multi-bed VSA is typically used in the size rage of 60 tons per day (TPD) and higher. The single bed process was adopted as a lower capital, simpler process for lower production ranges, typically 1 TPD up to 40 TPD. Typical single bed systems usually consist of a single blower train that is used for both the feed air provider as well as the regeneration vacuum system. The process usually incorporates automatic valves to direct the air and vacuum flows during the cycle. A newer embodiment of the single bed process uses a reversing blower to generate the feed stream and apply vacuum for the regeneration step. This latest embodiment is well suited for small to medium sized oxygen VSA production plants (1 to 10 TPD). One example of a single bed reversing blower (SBRB) VSA process of this type is described in U.S. Pat. No. 8,496,738, incorporated herein by reference in its entirety.

Although the single bed reversing blower (SBRB) VSA process is simple in practice, its simplicity comes with performance trade-offs when compared to multi-bed systems. Firstly, the lack of additional adsorber beds does not allow for a crucial bed to bed equalization. The pressure equalization step is key to lowering power consumption and increasing product oxygen recovery. Technologists in the art have overcome this deficiency by adding an equalization tank to the SBRB system (such as equalization tanks in SBRB systems provided by Air Liquide of Houston, Tex.).

Another problem encountered with single bed reversing blower VSA systems is that they are limited to relatively small optimal size, typically being that of small to medium size production plants in the 1 to 40 TPD range. This size limitation is due to the availability of blowers of exceptionally large sizes not being present in the market and lower power efficiency of the VSA process when compared to other processes in the larger (greater than 40 TPD) range.

Larger VSA plants tend to be of the two bed, two blower configuration. These plants are typically field erected and require buildings for the rotating equipment as well as significant civil engineering infrastructure, not only for the buildings but also for cooling water, instrument air, waste process water drains, etc. The typical reliability of a well engineered two bed VSA plant is ninety-eight percent. Reliability is defined as the on-stream availability of the equipment. In most applications this requires the customer to install a liquid oxygen backup system, with additional cost for the civil engineering work for foundations etc. and interconnection into the system, as well as the cost of the liquid oxygen tank. A need exists for improved methods for enhancing the reliability of VSA systems, such as to eliminate or minimize the need for liquid oxygen backup systems and to otherwise more effectively achieve the goals of the customer.

SUMMARY OF THE INVENTION

One solution to this problem is to employ multiple reversing blower VSA units connected through check valves to a common manifold. Each unit is equipped with a scroll pump (or similar pump) and a control system to manage outlet pressure. The pipe size for each unit and the check valve CV rating for each unit is the same. The pressure on all units is adjusted to vary around the same target center value. Pseudorandom variations are interposed into this pressure adjustment to "duty-cycle" the check valves open and closed to assure that no single machine delivers more flow than the rest. The control system is a proportional-integral-derivative control system within a control loop.

Operation of the multiple reversing blower VSA units together and coupled to a common manifold builds redundancy and reliability into the system. Individual units can be taken offline for servicing and the overall system supplying oxygen (or other product gas) through the manifold is maintained with an exceptionally high reliability. Also, the scaling of such systems can extend beyond the typical 40 TPD maximum. Even though individual units are somewhat less efficient than two bed systems or other gas separation technologies, due to the benefits of the enhanced reliability, such as avoiding the requirement of liquid oxygen backup and the lesser civil engineering and other infrastructure costs associated with the smaller SBRB VSA systems which are more modular and configured for installations with minimal infrastructure requirements.

As another technique for expanding single bed reversing blower VSA systems into larger production plants (typically greater than 40 TPD) several reversing blower VSA units are daisy chained to provide nth level expandable load sharing, with "n" representing the number of reversing blower VSA units. Units are automatically started and stopped as required for production flow demands. No complex external control system is required.

Each unit has a scroll pump which has its speed set to approximate that unit's flow relative to total output capacity. This analog signal is connected to an adjacent machine which will start when the flow rate passes a user adjustable level. Once started, the unit will continue to run until the flow of the first machine is below another, substantially lower, level. Units may be daisy chained in a circle, such as with the last unit (unit n) connected back the first unit. The user may control which machine is the master by pushing the start button on the desired machine. The outputs would all be coupled, such as to a common manifold, to supply oxygen or other product gases from the overall system.

In one exemplary example, n=5 and there are five reversing blower VSA units daisy chained together which can each output 10 TPD individually. One of the five units (it could be any one) is started and operates at the 10 TPD level. If demand exceeds 10 TPD, this is sensed and the next unit along the chain from the one that is operating is brought into operation. The system is now producing 20 TPD rate. If the manifold or other buffer tank for the oxygen or other product gas reaches its capacity, indicative that less than 20 TPD is required by the system, the system does not shut off the second unit, but rather shuts off the first unit, leaving the second unit to continue to operate. In this way, no single unit builds up significantly more hours of operation than any other unit in the chain.

If more than 20 TPD are demanded, such as by a buffer tank, manifold or other product gas collection system dropping below a desired capacity and/or pressure, a signal is generated to start up a third unit in the chain, and so on, up to the point where all five units are operating simultaneously to achieve up to 50 TPD of performance. Whenever output capacity is exceeding demand and such a signal is received, the unit which started first (or earliest) and which is still operating is the next unit to be shut down. When demand increases and another unit must be brought online, the next unit in the chain after the one that was most recently brought into operation is the next unit to be powered up.

The oxygen VSA system may be configured in a daisy chain utilizing multiple systems to achieve a desired production rate. Applications that require high on-stream time such as hospitals, certain critical oxygen enhanced combustion applications as well as any on-stream critical application would achieve a higher on-stream factor without the need for a liquid back-up system.

The on-stream percentage factor of the single bed reversing blower system is 98.5%, adding a second system increases the on-stream factor to 99.5% a third unit further elevates the on-stream factor beyond 99.95%. This dramatic increase in on-stream time is due to the fact that each unit is independent of any other unit in the daisy chain, hence the on-stream probability of the system as a whole is the product of the individual probabilities. In contrast, using a single dual bed oxygen VSA generator with typical on-stream factor of 98%, when combined with a LOX back-up system with a on-stream factor of 99.5, the system achieves an on-stream factor of 99.95.

The daisy chain concept can be designed to equal desired production with multiple units, or exceed production with additional capacity so as to meet application flow requirements at all times. This concept eliminates the reliance on LOX back-up in areas where it is not available or costly. This concept is also inherently safer by not requiring a liquid oxygen tank to be installed on-site.

By employing positive displacement type scroll pumps for compression of the oxygen (or other production gas) once separated from the process air and stored in the buffer tank, a correlation between the command frequency sent to the compressor and the flow rate of the system is provided. Use of the positive displacement scroll pumps also allows for assessment of the condition of the tip seals when the outlet flow is known. If the measured flow rate does not correlate properly to the VFD command frequency, a determination of maintenance requirements can be made. Further reliability is achieved by anticipating when such maintenance is required before unit failure and maintenance can be scheduled at periods when flow demand is anticipated. Also, by utilizing multiple singe bed VSA units, individual units can be taken offline for maintenance while maintaining a large percentage of the capacity of the system (e.g. eighty percent in a system with five units).

OBJECTS OF THE INVENTION

Accordingly, a primary object of the present invention is to enhance the reliability of air separation unit oxygen supply systems, such as for hospitals and other oxygen supply systems which require high reliability.

Another object of the present invention is to provide an oxygen supply system which is readily scaleable by adding additional individual units into the system.

Another object of the present invention is to utilize single bed reversing blower vacuum swing adsorption air separation units together in a group to provide higher reliability for an overall system than is present within individual larger units, by strategically coupling the individual units together.

Another object of the present invention is to provide a method for controlling a group of individual single bed reversing blower vacuum swing adsorption air separation units within a system of multiple units to achieve high reliability.

Another object of the present invention is to provide a high reliability vacuum swing adsorption air separation system comprised of multiple single bed reversing blower units which are modular and can be installed without extensive infrastructure requirements, to achieve scalability and reduced infrastructure costs.

Another object of the present invention is to provide a method and system for controlling individual single bed reversing blower vacuum swing adsorption air separation units so that individual units within the system operate a similar length of time and in a manner which allows for flexibly meeting demand and accommodating individual units coming offline for maintenance, while still keeping the system operating at near full capacity.

Other further objects of the present invention will become apparent from a careful reading of the included drawing figures, the claims and detailed description of the invention.

DESCRIPTION OF THE PREFERRED EMBODIMENT

Figure 2:
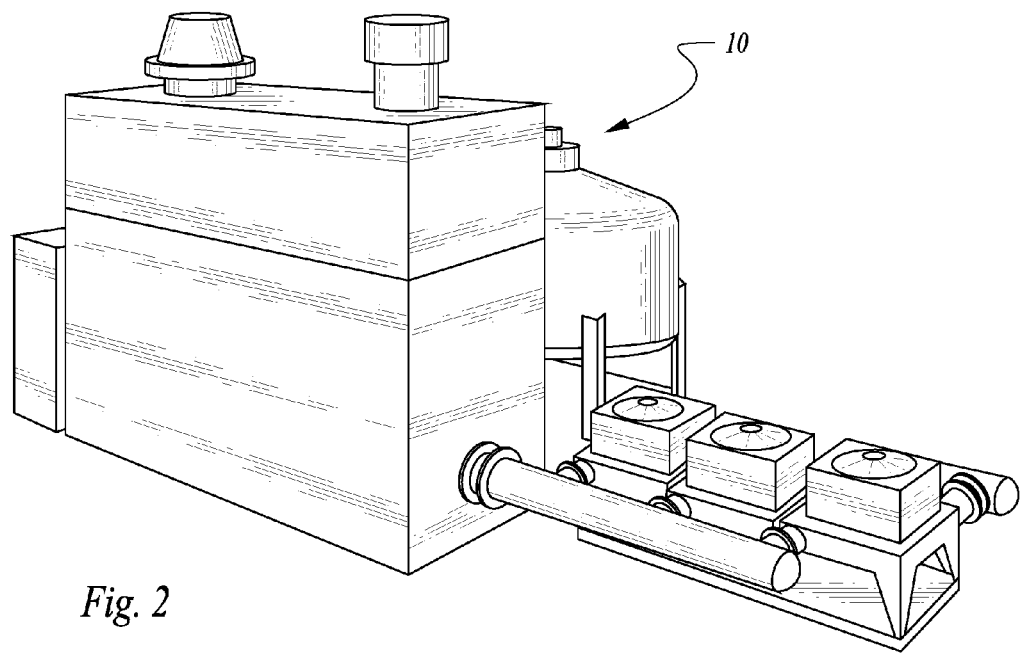
FIG. 2 is a perspective view of a single bed reversing blower vacuum swing adsorption air separation unit in one configuration implementing the process depicted in the schematic of FIG. 1.
Figure 3:
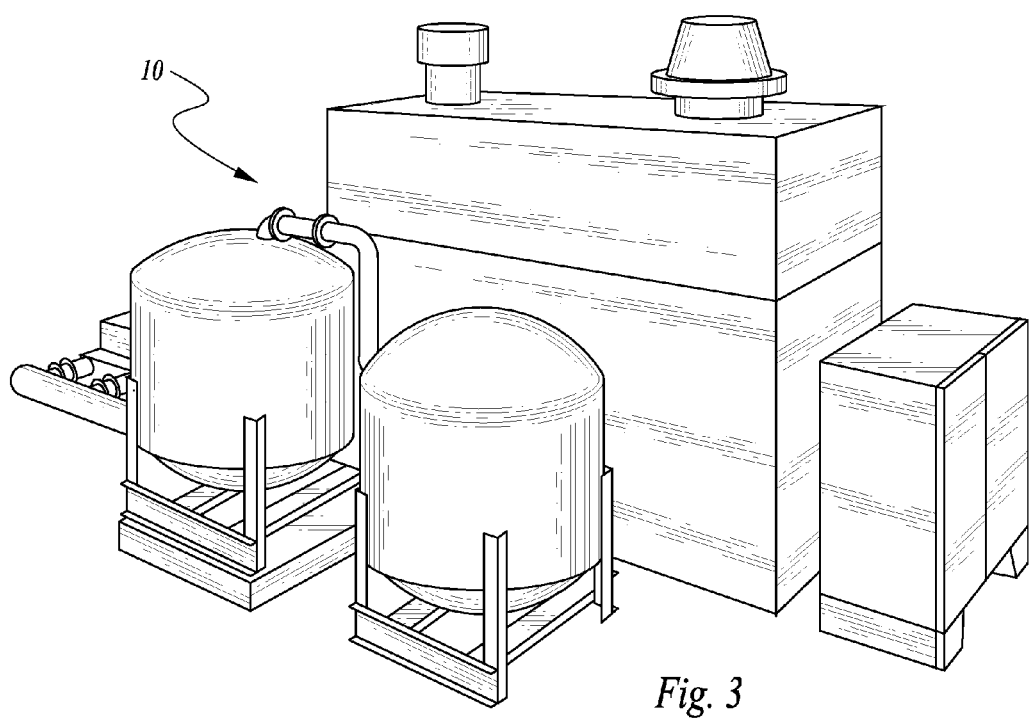
FIG. 3 is a perspective view of that which is shown in FIG. 2, but from a reverse point of view.

Referring to the drawings, wherein like reference numerals represent like parts throughout the various drawing figures, reference numeral 100 is directed to a multi-unit system comprised of multiple individual single bed reversing blower (SBRB) vacuum swing adsorption (VSA) units 10. The units 10 (FIGS. 1-3) are combined together within a multi-unit system 100 (FIG. 4) to provide larger amounts of $O_2$, as well as to enhance reliability and to allow for scalability and convenient maintenance without taking the overall multi-unit system 100 offline.

Figure 4:
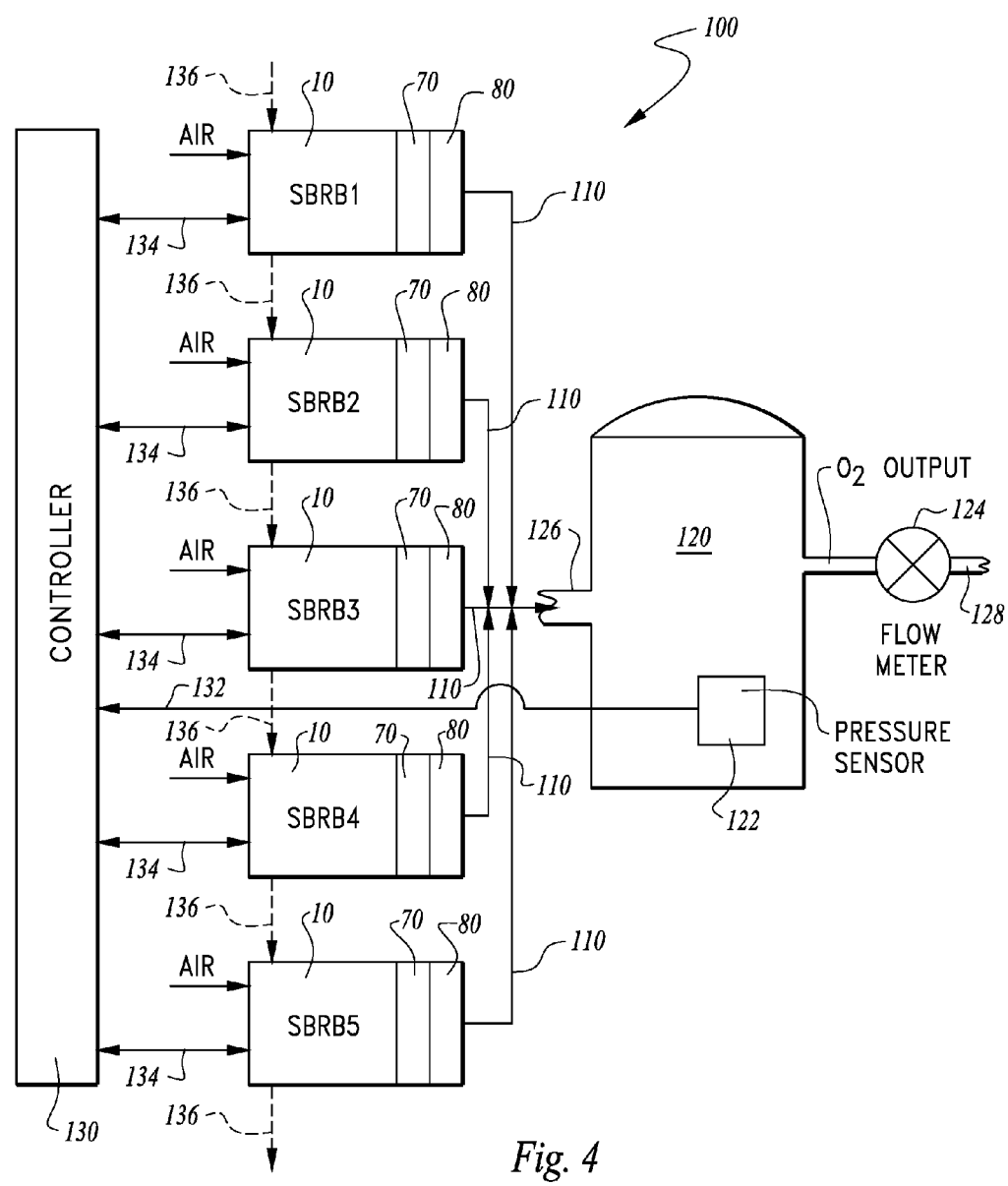
FIG. 4 is a schematic of a multi-unit air separation system which couples multiple single bed reversing blower vacuum swing adsorption air separation units together and feeding a common system buffer tank and with an associated controller and associated equipment for implementing a multi-unit system according to this invention.

In essence, and with particular reference to FIG. 4, basic details of the system 100 are described, according to a preferred embodiment. A plurality of individual SBRB VSA units 10 are included together in the system 100. Each unit 100 includes an output 110 leading to a system buffer tank 120 or other common $O_2$ supply. The system controller 130 is coupled to the units 10 (or control can be distributed to each unit 10) and also to sensors associated with the system buffer tank 120 or other common $O_2$ supply, for convenient management of operation of the individual units 10.

Figure 1:
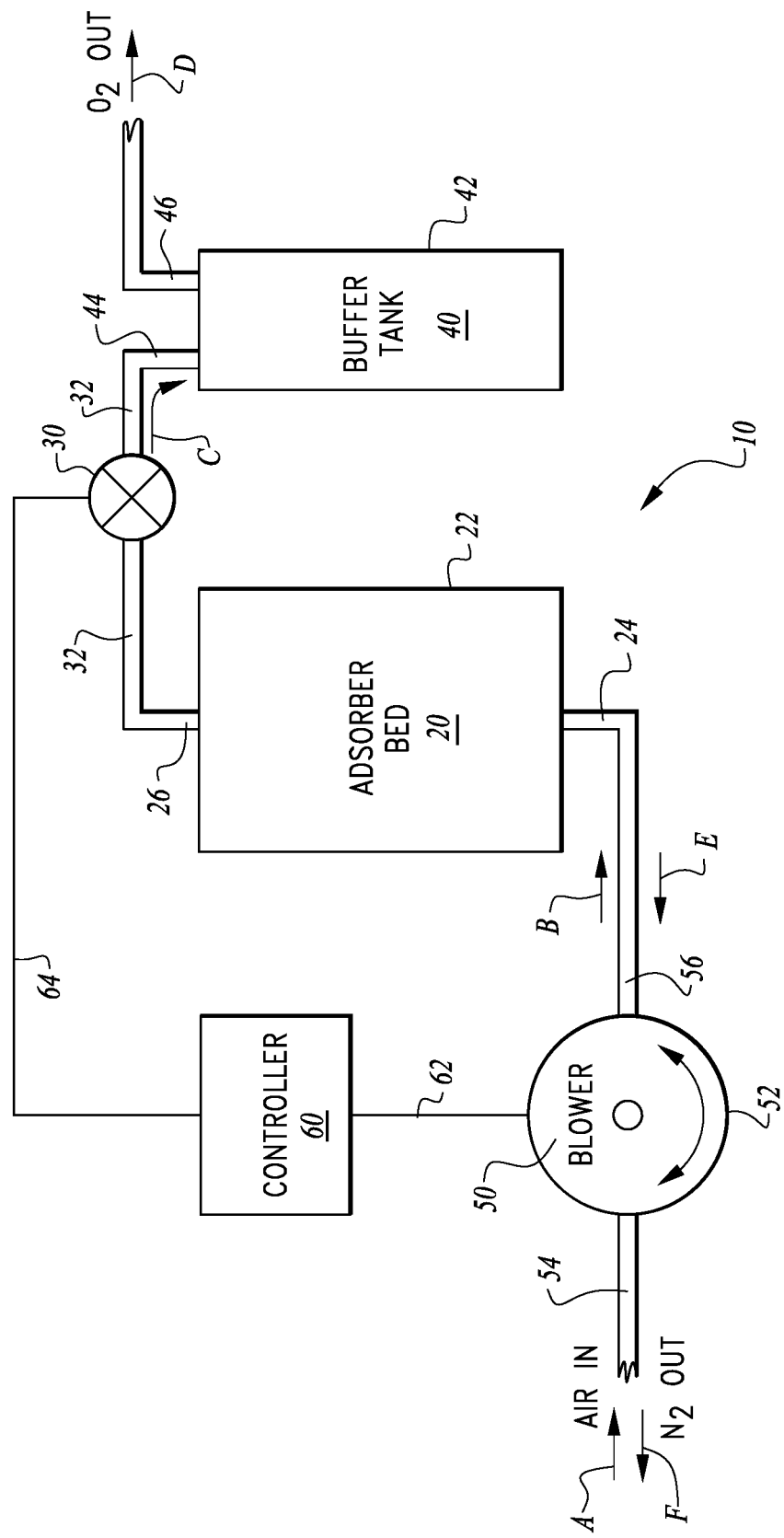
FIG. 1 is a schematic of an individual single bed reversing blower vacuum swing adsorption air separation unit illustrating operation of such an individual unit according to one embodiment of this invention.

More specifically, and with particular reference to FIG. 1, specific details of each individual SBRB oxygen separator unit 10 are described, according to a preferred embodiment. The oxygen separator 10 includes an adsorber bed 20 including an adsorber material therein which preferentially adsorbs nitrogen, CO2 and water over oxygen. A valve 30 is located downstream of the adsorber bed 20. A buffer tank 40 is provided downstream of the valve 30. A blower 50 defines a preferred form of pump located upstream of the adsorber bed 20. A controller 60 is coupled to the valve 30 and the blower 50 (or other pump) to control opening and closing of the valve 30 and to control a direction in which the blower 50 (or other pump) is operating, to either provide air into the adsorber bed 20 or pull a vacuum to desorb and remove nitrogen out of the adsorber bed 20. Normally, a heat exchanger is required between the blower and the adsorber bed to remove the heat generated when the air is compressed. The heat exchanger may be bypassed during the vacuum phase of the cycle.

With continuing reference to FIG. 1, details of the adsorber bed 20 are described according to this preferred embodiment. The adsorber bed 20 includes an enclosure 22 for containing the adsorber material. This enclosure 22 includes an inlet 24 spaced from an outlet 26. The inlet 24 and outlet 26 define preferred forms of first and second ports for access into the enclosure 22. The inlet 24 and outlet 26 normally are incorporated in closures or "end plates" which can be removed to allow access to the adsorption components in the enclosure 22. Otherwise, the enclosure 22 is preferably sealed to prevent leakage of gases into or out of the enclosure 22.

The adsorber material within the adsorber bed 20 could be any form of material which preferentially adsorbs nitrogen over oxygen. One such material is molecular sieve such as nitroxy siliporite. This material is preferably supplied in the form of beads which are either generally spherical in form or can be of irregular shape. Since the beads are composed of molecular sieve material within the enclosure 22, gaseous pathways extend through, between and around the adsorbent material.

Most preferably, a plenum is configured at the inlet and the outlet end of the adsorber bed to provide even gas flow across the cross section of the bed. In a preferred configuration, the inlet 24 is located below the outlet 26, and with the inlet 24 at a lowermost portion of the enclosure 22 and the outlet 26 on an uppermost portion of the enclosure 22. The enclosure 22 could have a variety of different shapes. In one embodiment, the enclosure 22 could be generally rectangularly shaped. The enclosure could be shaped like a pressure vessel to maximize an amount of vacuum to be drawn on the enclosure 22 while minimizing an amount of material strength (i.e. wall thickness or material choice) that must be designed into the enclosure 22. If the size of the adsorber material is sufficiently small to potentially pass through the inlet 24 or outlet 26, filters are provided at the inlet 24 and outlet 26 to keep the adsorbent material within the enclosure 22.

With continuing reference to FIG. 1, details of the valve 30 are described. The valve 30 is interposed on a line 32 extending from the outlet 26 of the adsorber bed 20 and extending to the buffer tank 40. This line 32 is preferably substantially rigid, especially between the valve 30 and adsorber bed 20, so that when a vacuum is drawn on the adsorber bed 20, the line 32 does not collapse. The valve 30 is preferably sealed to prevent leakage in any manner when in a closed position and to only allow passage of gas along the line 32 when in an open position.

The valve 30 is preferably coupled to a controller 60 which controls the opening and closing of the valve 30. Optionally, the valve 30 could have a controller built into the valve 30 that could be set a single time and then operate in accordance with its settings.

While the valve 30 would typically be programmed once and then operate in accordance with such settings, the valve 30 could optionally be controlled at least partially through a control system including sensors and feedback to the valve 30. For instance, an oxygen sensor could be provided adjacent the valve 30 or along the line 32 between the valve 30 and the adsorber bed 20 to detect oxygen concentration levels approaching the valve 30. Nitrogen adjacent the valve 30 would be indicative that the adsorbent material within the adsorber bed 30 is saturated with nitrogen and that the oxygen separator 10 needs to change operating modes, to have the blower 50 (or other pump) reverse to pull a vacuum and desorb nitrogen from the adsorber material and pull the nitrogen out of the adsorber bed 20 to recharge the system.

Normally control of the cycle is achieved with the use of pressure transducers which reverse the blower at appropriate times. Usually the purge cycle is initiated when the vacuum reaches a certain predetermined level. The valve 30 is then opened for a predetermined amount of time so that a purge layer of oxygen is allowed to purge the remaining nitrogen from the bed. So the pressure and vacuum cycle are determined by pressure and the purge portion of the cycle is timed.

Other sensors could also potentially be utilized to allow the oxygen separator 10 to operate most effectively. The valve 30 is preferably of a type which operates with a minimum of lubricant or which can operate with a lubricant which is compatible with the handling of oxygen. The valve 30 and other portions of the oxygen separator 10 are also preferably formed of materials which are compatible with the handling of oxygen. For instance, brass is often effective in handling of oxygen and so brass is one material from which the valve 30 could be suitably manufactured when the system 10 is used for oxygen separation.

With continuing reference to FIG. 1, details of the buffer tank 40 are described according to a preferred embodiment. The buffer tank 40 is not strictly required for operation of this invention, but allows for the system in the form of the oxygen separator 10 to deliver oxygen substantially continuously, and to moderate pressure spikes in the system. The buffer tank 40 includes an enclosure 42 with an input 44 and an output 46 in FIG. 1. However, normally the buffer tank does not have a separate inlet and outlet. Since its purpose is simply to be an accumulator and minimize the pressure fluctuations inherent in the pressure swing adsorption process. The input 44 is coupled to the line 32 on a side of the valve 30 downstream from the adsorber bed 20.

The buffer tank 40 would typically have some form of regulator valve on the output 46 which would deliver oxygen out of the buffer tank 40 when oxygen is required by oxygen utilizing systems downstream of the buffer tank 40. The input 44 of the buffer tank 40 can remain in fluid communication with the valve 30. The buffer tank 40 can contain oxygen at above atmospheric pressure and at a pressure matching or slightly below an operating pressure of the adsorber bed 20 when the adsorber bed 20 is actively adsorbing nitrogen and oxygen flows into the buffer tank 40.

A sensor can be associated with the buffer tank 40 which cooperates with the controller 60 to shut off the oxygen separator 10 when the buffer tank 40 nears a full condition. In many applications a compressor is located downstream from the buffer tank 40 to fill oxygen vessels. When the vessels are full the system would be shut off. If required, a pressure regulator can also be provided on the output 46 of the buffer tank 40 so that pressure of oxygen supplied out of the buffer tank 40 remains substantially constant. Similarly, an oxygen pump could be provided downstream of the buffer tank 40 if the oxygen were required to be supplied at an elevated pressure above pressure within the buffer tank 40.

Most preferably, the buffer tank 40 is not a particularly high pressure tank so that the oxygen separator 10 including the blower 50 (or other pump) and adsorber bed 20 do not need to operate at a particularly high pressure when delivering oxygen to the buffer tank 40. By minimizing the pressure of the buffer tank 40, the weight of the buffer tank 40 (and other components of the system 10) can be significantly reduced. Furthermore, the power consumed by the blower is reduced as the pressure drop across the blower is reduced.

With continuing reference to FIG. 1, details of the blower 50 (or other pump) are described according to this preferred embodiment. This blower 50 generally includes a housing 52 with some form of prime mover therein coupled to a driver, such as an electric motor. The housing 52 of the blower 50 includes an entry 54 in direct access with a surrounding environment in a preferred embodiment of this invention. A discharge 56 is also provided on the housing 52 which is located on a side of the blower 50 closest to the adsorber bed 20.

The blower 50 is preferably in the form of a two or three lobed rotary blower coupled in direct drive fashion to an electric motor. In one embodiment the electric motor is a five horsepower three phase motor and the rotary blower is a two or three lobed blower and can deliver approximately one hundred cubic feet per minute when operating at atmospheric pressure. This rotary blower is also preferably configured to have acceptable performance when drawing a vacuum on the adsorber bed 20.

The lobes of the rotary blower are preferably configured so that they are of approximately similar efficiency in moving gases through the blower 50 between the entry 54 and the discharge 56 in either direction. In one form of the invention, the lobes are thus symmetrical in form so that they act on the air similarly in both directions of rotation for the blower 50.

The blower 50 is preferably substantially of a positive displacement type so that it maintains an adequate performance when drawing a vacuum on the adsorber bed 20 so that nitrogen can be effectively desorbed from the adsorber material in the adsorber bed 20 when the blower 50 is operating in a reverse direction to pull nitrogen out of the adsorber bed 20 and deliver the nitrogen out of the entry 54.

Most preferably, the blower 50 is coupled in direct drive fashion to the electric motor (or though a gear box). Most preferably, the electric motor is a three phase alternating current motor which can easily be reversed by reversing two of the phases. In this way, the controller 60 need merely reverse two poles of the three phase motor. In an other embodiment a direct current, permanent magnet may be used wherein the direction of the rotation can be reversed by reversing the polarity which in turn will reverse the rotation of the blower. Almost all three phase electric motors are capable of being reversed as above. Direct current motors are also readily available from many manufacturers which reverse their rotation direction by changing polarity.

Other types of pumps could alternatively be utilized for drawing air into the adsorber bed 20 and pulling nitrogen out of the adsorber bed 20 for the oxygen separator 10. For instance, such a pump could be a positive displacement pump, such as a piston pump or a peristaltic pump. Other forms of positive displacement pumps could also be utilized including gerotor pumps, gear pumps, etc. Other forms of pumps rather than strictly positive displacement pumps could also be selected, such as centrifugal pumps or axial flow pumps. The most efficient scheme for pumping the air into the system and exhausting the bed depends on the requirements of the final user.

With continuing reference to FIG. 1, details of the controller 60 are described, according to a preferred embodiment. The controller 60 is shown as a separate unit coupled to the blower 50 (or other pump) through a blower signal line 62 and coupled to the valve 30 through a valve signal line 64. The controller 60 could in fact be integrated into the valve 30 or integrated into the blower 50 (or other pump) or be provided as a standalone unit such as depicted in FIG. 1. It is also understood that the controller 60 could be split into two (or more) separate devices, either separate from the blower 50 and valve 30 or integrated into both the blower 50 and valve 30.

The controller 60 provides the basic function of controlling a direction in which the blower 50 is operating and whether the valve 30 is open or closed. Control systems have been used which simply time the cycle. More often, the controller is configured to react to pressure or some other input.

A preferred sequence for directional control of the blower 50 and opening and closing of the valve 30 are described in detail below. The controller 60 could be in the form of a programmable logic device or could be in the form of an application specific integrated circuit, or could be in the form of a CPU of a special purpose computer or a general purpose personal computer or other computing device. The controller 60 could be configured to have operating parameters set at a central controlled location, such as during manufacture, or could be configured to allow for programming in the field before and/or during operation.

In use and operation, and with particular reference to FIG. 1, details of the operation of the oxygen separator 10 of this invention are described. It will be understood that the invention would operate similarly when separating other gases than when separating oxygen from air, and the operation of this invention as an oxygen separator is provided merely as one example for this invention.

Initially, the separator 10 is configured with the valve 30 closed and the blower 50 (or other pump) is caused to rotate in a direction driving gases out of the adsorber bed 20 (along arrow E). This is the vacuum cycle used to desorb nitrogen out of the beads in the bed 20. In particular, the blower 50 rotates to cause gases to be pulled into the entry 54 (along arrow E). This gas is removed from the bed 20 by the blower 50 and caused to pass through the discharge 54 away from the adsorber bed 20 along arrow F and to the surrounding atmosphere.

Nitrogen (or other undesirable gas) is adsorbed by the adsorber material within the adsorber bed 20. Most typically, the adsorber material also adsorbs water vapor and carbon dioxide, as well as potentially trace amounts of other gases, including pollutants.

During the last portion of the vacuum cycle valve 30 is opened to allow a small amount of the contents of the buffer tank to be introduced into the adsorber bed. This step is called the "purge phase." The purge phase is used to purge nitrogen (as well as some carbon dioxide and water out of plumbing lines and free space between the valve 30 and the blower 50, but not appreciably out into the surrounding atmosphere. This short purge phase is typically timed to match an amount calculated or determined by experiment, but could also be ended based on sensor readings. This purge phase ends the vacuum cycle and precedes the adsorption cycle to follow.

The blower is then reversed to commence the adsorption cycle. Air is drawn into the blower at the inlet 54 port of the blower 50 (in the direction shown by arrow A). The air flows (along arrow B) into the adsorber bed 20 where nitrogen, carbon dioxide, and water are preferentially adsorbed. The gas not adsorbed in the adsorber bed (normally a mixture of oxygen and argon) is passed through valve 30 into the buffer tank 40.

The adsorber bed 20 might also adsorb oxygen to some extent. However, the adsorber material is selected so that it preferentially adsorbs nitrogen more than oxygen. Due to the presence of the adsorber material within the adsorber bed 20, substantially only oxygen (or other desirable gas) can leave the adsorber bed 20 through the outlet 26. Typically, argon also remains with the oxygen. Because air is approximately 1% argon and approximately 20% oxygen, this twenty to one ratio typically causes the gases being discharged from the adsorber bed 20 at the outlet 26 to be approximately 95% oxygen and 5% argon.

Because the valve 30 is opened, this oxygen can flow (along arrow C) through the valve 30 and into the buffer tank 40. The buffer tank 40 is thus charged with oxygen. If oxygen is desired, it can be discharged from the buffer tank 40 output 46 (along arrow D). The adsorber material within the adsorber bed 20 eventually becomes saturated with nitrogen and other compounds, such as water vapor and carbon dioxide. The point of such saturation can be calculated in advance and calibrated into the separator 10. Alternatively, a sensor can be provided, such as along the line 32 adjacent the valve 30, to sense for nitrogen or other contaminants within what should be substantially only oxygen and argon. Such a sensor can cause the system to detect such saturation of the adsorbent material within the adsorber bed 20 and thus change the mode of operation of the oxygen separator 10 from the adsorption cycle to the vacuum cycle. Other sensors to trigger the change could be pressure sensors or volumetric flow rater sensors either alone or in combination with a clock or a calibration table. The goal is to prevent nitrogen or other contaminates from passing the valve 30 after adsorption bed 20 saturation.

When such saturation has either been sensed as occurring or predicted to occur, the separator 10 changes operation modes by closing the valve 30. Then the blower 50 (or other pump) reverses its direction of operation. For instance, the controller 60 can reverse two of the three phases of a three phase electric motor coupled to the blower. The blower 50 is then caused to turn in an opposite direction and begins pulling gas (along arrow E) out of the adsorber bed 20 and into the blower 50 from the discharge 56 and out of the blower 50 through the entry 54 and out into a surrounding environment, as a repeat of the vacuum cycle described above.

The controller 60 can be programmed with a typical amount of time required to effectively desorb the nitrogen from the adsorbent material within the adsorber bed 20. Normally, the controller 60 senses a threshold low pressure in the adsorber bed 20. The system operation then continues as described above with a short purge phase followed by return to the desorption cycle.

This operating sequence for the oxygen separator 10 can repeat itself potentially indefinitely. When the buffer tank 40 becomes full (or vessels being filled from the buffer tank are full), an appropriate sensor associated with the buffer tank 40 can indicate that it is full and shut off the oxygen separator 10. As further amounts of oxygen are sensed as being needed, such as by a drop in pressure in the buffer tank 40, a signal can be sent to the controller 60 to again cause the system to commence operation.

The individual separator units 10 are provided as individual units 10 within an overall set of units together with outputs 110, a system buffer tank 120 or other common $O_2$ supply and a controller 130 to provide the multi-unit system 100 of this invention. The number of individual SBRB units 10 supplied within the system 100 can vary with at least two units 10 being provided. Also, the number of units 10 within the system 100 can increase (or decrease) to match requirements for the overall system 100, especially if the requirements for the system 100 should change over time, such as in a manner increasing demand or decreasing demand significantly. Some subsystems associated with the individual units 10 could be combined together in variations of the system, such as by having power supplied to the blowers 50 supplied from common motors, or from individual motors that receive power from a common electric power supply bus. Typically, air inlets 54 of individual units 100 would be spaced from each other sufficiently to avoid discharge of nitrogen from one unit 10 (during a recharge phrase for that unit) affecting performance of adjacent units 10 (while in a production phase).

With particular reference to FIG. 4, particular details of the multi-unit system 100 are described, according to this preferred embodiment. Individual units 10 are installed at a site where $O_2$ supply is required. Outputs 110 are coupled to each of the units 10 which lead to the system buffer tank 120 (or other common $O_2$ supply) for the multi-unit system 100. Most preferably, these outputs 110 are fed by positive displacement pumps, such as scroll pumps 70, through a check valve 80 which prevents back flow into the individual units 10. The various scroll pumps 70 associated with each unit 10 have similar pressure settings which define a pressure and supply of $O_2$ into the system buffer tank 120, and assure balance of the overall system 100. The check valves 80 prevent one unit 10 from pushing $O_2$ into other units 10, but rather only feeding the system buffer tank 120 or other common $O_2$ supply.

The system buffer tank 120 includes an $O_2$ input 126 leading into the system buffer tank 120 from the individual units 10 and an $O_2$ output 128 which can lead to a facility which utilizes oxygen. Generally, demand of the system 100 is defined as the $O_2$ being utilized by the equipment, systems, etc. downstream of the $O_2$ output 128. Generally, system 100 supply is defined by the flow rate of $O_2$ through the $O_2$ input 126 into the system buffer tank 120. A flow meter 124 is preferably provided on the $O_2$ output 128 to measure the demand on the system 100. Supply associated with the system 100 could be similarly measured by a similar flow meter coupled to the $O_2$ input 126 or adjacent thereto. Alternatively, flow meters associated with the individual units 10 could be utilized and summed for operating units, or derived by adding known outputs from the individual units 10.

Preferably, a pressure sensor 122 is also associated with the system buffer tank 120. The pressure sensor 122 can be utilized to maintain a pressure within the system buffer tank 120 within predefined desired ranges. In one embodiment, demand in excess of supply can be determined by measuring if the pressure sensor 122 is measuring a decreasing pressure, and system 100 supply over demand can be determined by detecting pressure within the system buffer tank 120 which is increasing. The pressure sensors can also cause units to come on or offline if present maximum or minimum pressure thresholds are encountered. In other embodiments, the demand can be measured directly by measuring with the flow meter 124. Supply can similarly be measured directly with a flow sensor or if individual flow sensors associated with the individual units 10, or based on known performance of the individual units 10.

Preferably, data from the flow meter 124 and pressure sensor 122, as well as any other meters and/or sensors are fed to the controller 130 to provide at least some portion of control of the overall system 100. The system controller 130 thus includes a sensor input 132 and various command outputs 134 which lead to each individual unit 10. Furthermore, an overall control system associated with the multi-unit system 100 preferably includes peer signaler pathways 136 which can be provided between individual units 10, especially for a daisy chained peer-to-peer embodiment of this invention. In such a peer-to-peer embodiment, some or all of the controller 130 functions could be handled by the units 10 themselves, so that the controller 130 could be simplified or replaced by controller portions associated with each unit 10.

Generally, the system 100 operates as follows, in one embodiment. Initially, one unit 10 is brought into operation by an operator. Demand for $O_2$ causes $O_2$ to flow out of the system buffer tank 120, while $O_2$ is supplied into the system buffer tank 120 from the one operating unit 10. Utilizing various methods identified above, if demand is exceeding supply, a second unit 10 is brought online. If demand is still exceeding supply, a third unit is brought online. This process is repeated until demand is met by supply. If supply exceeds demand by an amount greater than the output of one unit 10, then one of the units is taken offline. The controller 130 keeps track of which unit has been operating longest and takes offline that unit which has operated longest. In this way, the various units 10 are operated a similar amount.

Units 10 can also be taken offline for maintenance and thus skipped by the overall operating algorithm employed by the controller 130. New units 10 can be added to the system should expansion be required, without requiring redesign of the overall system.

In one embodiment, the signal to bring a new unit 10 online is provided through the peer signaler 136. A unit 10 which was last brought online has back pressure associated therewith monitored (or receives signals from sensors elsewhere in the system 100 such as with the buffer tank 120). If the back pressure is relatively low, at a level indicating that demand is exceeding supply, a signal is sent from that unit 10 which measured the relatively low back pressure to the next unit 10 in the chain, the signaler sending a command signal to bring the next unit in the chain online. This process can be continued until all of the units are brought online if necessary.

If back pressure builds up, no new units are brought online. If back pressure continues to build up, one of the units is taken offline. The controller 130 can be relied upon to send the signal to take a unit offline. In one embodiment, the controller 130 monitors hours of operation of the individual units in aggregate, as well as the amount of time that each currently operating unit has been operating. The controller can thus determine which unit 10 should be taken offline, with a preference for the unit which has operated longest. No individual unit 10 should then be taxed a significantly greater amount than other units, but rather they experience a similar duty cycle.

In one embodiment, rather than having a centralized controller 130, a decentralized control algorithm can be partially embedded within each of the units 10 and utilizing the peer signaler 136 can function together in a simplified but robust fashion. When back pressure associated with the individual units is below a threshold amount, the most recently started unit sends the signal to the next unit 10 in the chain to bring that next unit 10 in the chain online. When back pressure is building, and exceeds a threshold level, the unit which was first brought online is taken offline.

Before it is taken offline, it sends a signal to the next unit in the chain communicating to that next unit 10 in the chain that it is now the longest running unit. If back pressure still remains below a threshold amount after a predetermined amount of time, the next unit which now has been signaled as being the longest operating unit comes offline. But before coming offline, this unit 10 sends a signal to the next unit in the chain that the next unit 10 in the chain is now the longest operating unit. In such a fashion, a completely decentralized control algorithm can be incorporated into each of the individual units 10, and a specific controller 130 is not required.

By utilizing back pressure sensors associated with each unit 10, the flow meter 124 and pressure sensor 122 become non-critical. It is recognized that it is desirable in various systems to have a sensor package to allow an operator to monitor various different performance parameters for the system 100. However, it is beneficial when such monitoring sensors are not critical to the control algorithm, but merely are provided for monitoring and troubleshooting purposes, as well as to build in safety and redundancy subsystems.

While the various units 10 are depicted as a series of five units (FIG. 4) a greater or lesser number of units 10 could be provided. The last unit 10 in the series (SBRB 5) is coupled to the first unit in the series (SBRB 1) so that the units 10 are daisy chained together with no particular unit actually being a first or last unit 10. Any unit 10 within the system 100 could be the initial unit brought online, and when so brought online would hold the designation as being the longest running unit 10 until the unit 10 is brought offline (and before being brought offline sends the signal to the next unit in the chain that it is the next unit to be brought offline as it now has the status as the longest running unit).

In one embodiment, a signal to initially turn on the system 100 is not sent to an individual unit or implemented by signaling a unit of an operator's choice, but rather goes to a common control unit which can randomize the request and send a signal to bring a unit 10 online based on a random selection process, so that operator habits will not cause one unit 10 to operate significantly more than any other. To allow individual units 10 to be brought offline for maintenance, replacement, or to resize the overall system 100, the interconnecting peer signaler 136 can merely be disconnected from the unit being taken offline and bypassed to the next unit in the chain, such as with an appropriate patch cord.

Figure 5:
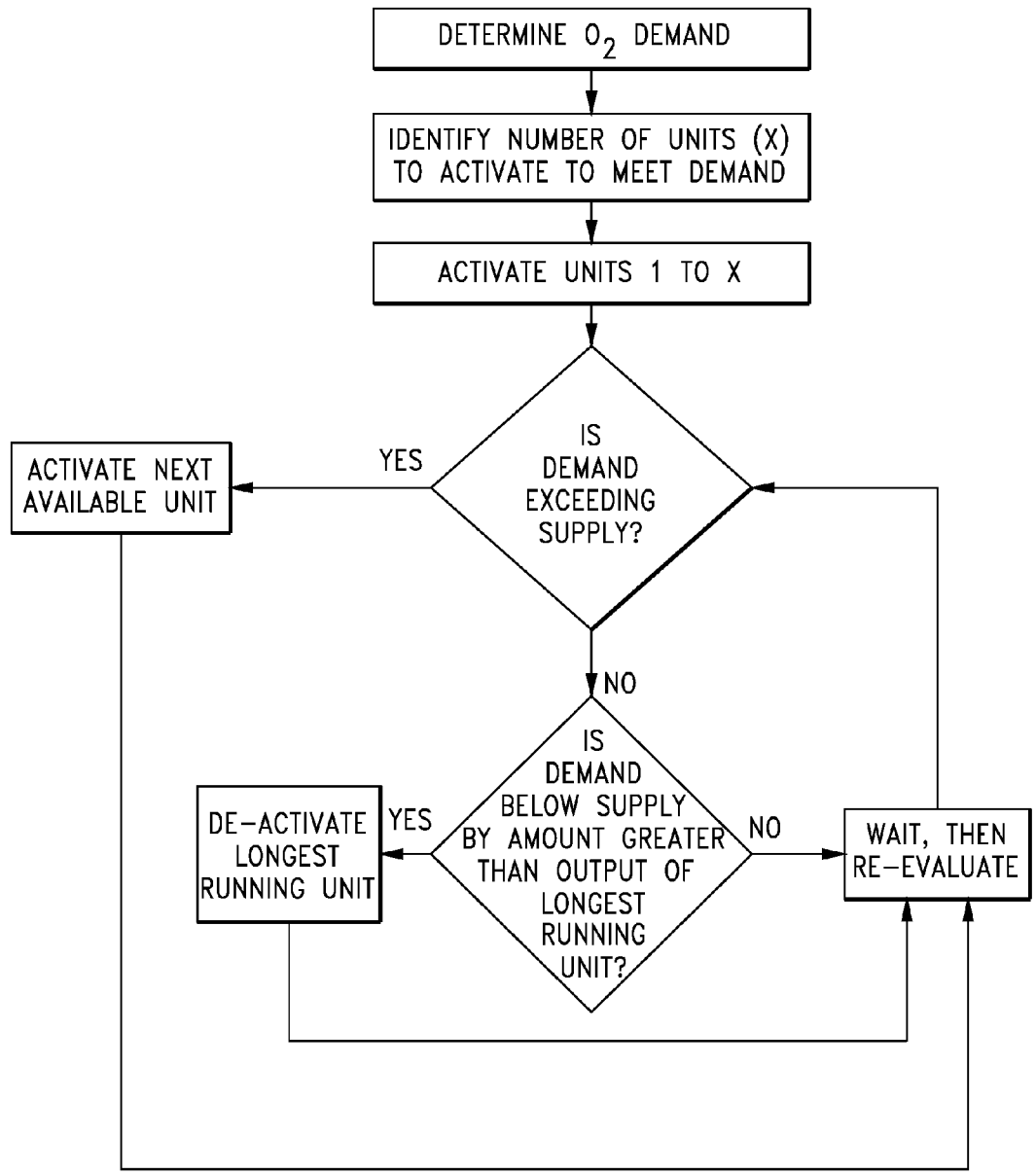
FIG. 5 is a flow chart illustrating aspects of how the multiple units in the system of this invention are controlled.

With particular reference to FIG. 5, a basic embodiment of the control diagram associated with this invention is provided. In this control diagram, a number of units 10 brought online is identified as "X" and the system activates units based on the demand so that demand is met. Then, over time, a control algorithm is implemented which frequently reevaluates if demand is exceeding supply, and if so activating a next available unit. If demand is not exceeding supply and demand is below supply by an amount greater than an output of a longest running unit, then a longest running unit is taken offline. Otherwise, a preselected amount of time is allowed to pass and then reevaluation is then again performed.

This disclosure is provided to reveal a preferred embodiment of the invention and a best mode for practicing the invention. Having thus described the invention in this way, it should be apparent that various different modifications can be made to the preferred embodiment without departing from the scope and spirit of this disclosure. When structures are identified as a means to perform a function, the identification is intended to include all structures which can perform the function specified.

What is claimed is:

1. A method for high reliability $O_2$ supply, including the steps of:
   installing a plurality of single bed reversing blower vacuum swing adsorption air separation units, each unit having an air inlet and an $O_2$ outlet;
   coupling the $O_2$ outlets of each unit to a common $O_2$ supply;
   operating at least one of the single bed reversing blower vacuum swing adsorption air separation units;
   sensing $O_2$ demand;
   bringing an additional single bed reversing blower vacuum swing adsorption air separation unit into operation if $O_2$ demand is greater than $O_2$ supply;
   taking a single bed reversing blower vacuum swing adsorption air separation unit out of operation if $O_2$ demand is less than $O_2$ supply by an amount sufficient to meet demand with one fewer unit operating; and
   said taking step including taking out of operation the single bed reversing blower vacuum swing adsorption air separation unit which has been operating longest.

2. The method of claim 1 wherein said coupling step includes the common $O_2$ supply including a system buffer tank.

3. The method of claim 2 wherein said sensing step includes a pressure sensor on said system buffer tank, with increasing pressure within the system buffer tank indicating supply greater than demand for the system and decreasing pressure within the system buffer tank indicating system demand greater than system supply.

4. The method of claim 2 wherein said sensing step includes a flow rate sensor downstream of the system buffer tank with flow rate out of the system buffer tank compared to supply of $O_2$ into the system buffer tank from the at least one single bed reversing blower vacuum swing adsorption air separation unit of said operating step, and with flow out of the system buffer tank greater than flow into the system buffer tank indicative of demand greater than supply.

5. The method of claim 1 wherein said taking step includes taking a single bed reversing blower vacuum swing adsorption air separation unit out of operation if supply of said sensing step exceeds demand of said sensing step by an amount at least as great as $O_2$ output of a single one of the single bed reversing blower vacuum swing adsorption air separation units.

6. The method of claim 1 wherein said taking step includes taking a single bed reversing blower vacuum swing adsorption air separation unit out of operation if pressure within the common $O_2$ supply exceeds a predetermined amount.

7. The method of claim 1 wherein said bringing step includes also bringing an additional single bed reversing blower vacuum swing adsorption air separation unit into operation if pressure within the common $O_2$ supply drops below a predetermined minimum pressure.

8. The method of claim 1 wherein said coupling step includes interposing a positive displacement scroll pump between each of the single bed reversing blower vacuum swing adsorption air separation unit and the common $O_2$ supply.

9. The method of claim 8 wherein said coupling step includes interposing a check valve between each of the scroll pumps and the common $O_2$ supply, the check valve configured to prevent flow from the common $O_2$ supply back into any of the single bed reversing blower vacuum swing adsorption air separation units.

10. The method of claim 1 wherein each of said plurality of single bed reversing blower vacuum swing adsorption air separation units includes a demand sensor associated with the $O_2$ outlets thereof and a command signaler coupled to a separate one of the single bed reversing blower vacuum swing adsorption air separation units, with each of the units having a command signaler coupled to a different one of the other units, such that each of the units has a command signaler coupled to one of the other units and is itself receiving a command signaler from another one of the plurality of units;
    bringing one of the units into operation;
    sensing demand on the unit brought into operation and if demand is greater than supply of the unit brought into operation then signaling through the command signaler for an additional one of the units to be brought into operation;
    that new unit brought into operation in turn sensing its demand and in turn commanding through the command signaler a next unit to be brought online if demand is exceeding supply; and
    a controller coupled to each of the units shutting off the unit which has operated longest if supply exceeds demand by an amount greater than $O_2$ output of an individual unit.

11. A system for high reliability production of $O_2$, comprising in combination:
    a plurality of individual single bed reversing blower vacuum swing adsorption air separation units, each unit having an air inlet and an oxygen outlet;
    a common $O_2$ supply, said $O_2$ outlets of each single bed reversing blower vacuum swing adsorption air separation units coupled to said common supply;
    an $O_2$ demand sensor;
    a controller coupled to each of said plurality of individual single bed reversing blower vacuum swing adsorption air separation units in a manner allowing said plurality of individual units to be brought into operation and taken out of operation individually; and
    said controller taking offline longest running ones of said plurality of individual units when supply into the common $O_2$ supply exceeds demand out of said common $O_2$ supply by an amount sufficient to meet demand with one fewer of said units operating.

12. The system of claim 11 wherein said common $O_2$ supply includes a system buffer tank having an $O_2$ input fed by said $O_2$ outlets of said plurality of individual units and an $O_2$ output.

13. The system of claim 12 wherein said $O_2$ demand sensor includes a pressure sensor sensing pressure within said system buffer tank, said pressure sensor coupled to said controller.

14. The system of claim 12 wherein said $O_2$ demand sensor includes a flow rate sensor on said $O_2$ output of said system buffer tank, said flow rate sensor coupled to said controller.

15. The system of claim 11 wherein each of said plurality of individual single bed reversing blower vacuum swing adsorption air separation units includes a scroll pump at said $O_2$ outlet feeding oxygen to said common $O_2$ supply.

16. The system of claim 15 wherein a check valve is interposed between each of said scroll pumps of each of said plurality of individual units and said common $O_2$ supply.

17. A simplified system for high reliability production of oxygen from multiple individual single bed reversing blower vacuum swing adsorption air separation units, comprising in combination:

a plurality of individual reversing blower vacuum swing adsorption air separation units daisy chained together, each unit including an air inlet and an $O_2$ outlet, each unit including an $O_2$ demand sensor associated with said $O_2$ outlet, and each said unit including a signaler interconnection to a next unit within said daisy chain;

each said $O_2$ outlet of each said unit feeding a common system $O_2$ output; and a controller coupled to each of said individual units, said controller deactivating a longest running unit when supply exceeds demand by an amount greater than output of a single individual said unit.

18. The system of claim 17 wherein said common system $O_2$ output includes a system buffer tank having an $O_2$ input fed by said $O_2$ outlets of said plurality of individual units.

19. The system of claim 18 wherein said signaler includes an activation signal sent by a last operating one of said units when said $O_2$ demand sensor of said last operating one of said units detects demand exceeding supply.

20. The system of claim 19 wherein said $O_2$ demand sensor is a back pressure sensor.

* * * * *